March 3, 1970  M. L. MILLER  3,498,701
MULTI-FOCAL EYEGLASS ASSEMBLY
Filed Jan. 11, 1968

INVENTOR
MARY LOUISE MILLER

3,498,701
MULTI-FOCAL EYEGLASS ASSEMBLY
Mary Louise Miller, Bellefonte, Pa., assignor to
Donald S. Miller, Centre County, Pa.
Filed Jan. 11, 1968, Ser. No. 697,179
Int. Cl. G02c 7/08
U.S. Cl. 351—57                                    4 Claims

ABSTRACT OF THE DISCLOSURE

A multi-focal eyeglass construction comprising a frame including a pair of primary generally semi-circular lenses, and a pair of segmental secondary lenses pivoted to the rims of the primary lenses, and movable from a position overlying the lower portion of the primary lenses to a position above the primary lenses, a receptacle being provided in the top of the frame for the reception of the secondary lenses when in the upper position.

---

This invention relates to eyeglasses, and more particularly to a multi-focal eyeglasses, and has as its primary object the provision of a spectacle frame adapted to hold single focus lenses, such as used in distance viewing, and having pivoted thereto supplemental segmental lenses which may be shifted into and out of viewing position for close work such as reading.

A further object of the invention is the provision of such a receptacle frame having a receptacle integral with the frame across the top thereof into which the secondary lenses may be folded when not in use.

A further object of the invention is the provision of a cover for such a receptacle which, when the secondary lenses are not in use, will completely conceal the same from view.

A further object of the invention is the provision of catch or detent means, such as a magnetic catch, which will hold the secondary lenses in position for use.

Still another object of the invention is the provision of a composite spectacle frame of this nature which may be readily converted from a distant focus lens to a tri-focal or bifocal lens assembly for close work which is sturdy and durable in construction, reliable and efficient in use, ornamental in appearance, and relatively simple and inexpensive to manufacture and utilize.

Other objects will in part be obvious, and in part be pointed out as the description of the invention proceeds, and shown in the accompanying drawing wherein there is disclosed a preferred embodiment of this inventive concept.

In the Drawing.

Similar reference characters refer to similar parts throughout the several views of the drawing.

Figure 1:
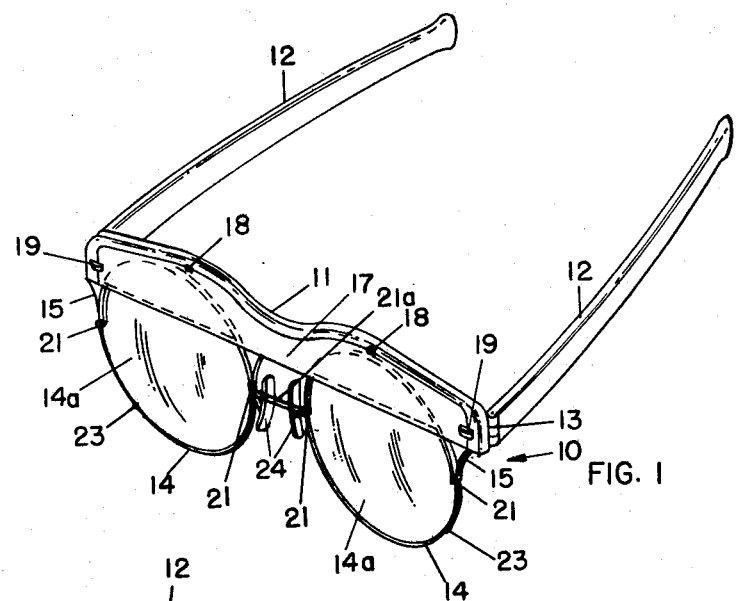
FIGURE 1 is a perspective view of one form of eyeglasses constructed in accordance with the instant invention, showing the secondary lenses in inoperative position.

Having reference now to the drawing in detail, there is generally indicated at 10 a spectacle assembly which comprises a frame having a top bar 11, conventional temples 12 being hinged as by hinges 13 to the ends thereof. Lens frames 14 depend from the top bar 11 in conventional manner and include connections 15 to the ends of the top bar. Each lens frame 14 contains a conventional ground lens 14a adapted for normal distant viewing.

The top bar 11 is hollow and defines a transverse pocket recess or receptacle 16 which is normally closed by a closure plate 17 which is hinged to the top by suitable wire hinges 18. Finger engaging members 19 at each end of cover 17 permit the opening and closing of receptacle 16 as desired.

Figure 4:
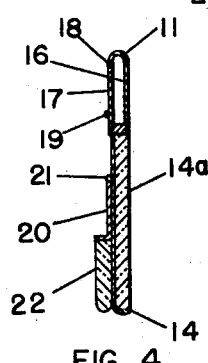

Hinged to an intermediate point, preferably adjacent the transverse axis of lens frames 14, are a pair of substantially semicircular supplemental lens rims 20, the hinges being indicated at 21. A bar 21a connects adjacent inner hinges 21 so that supplemental lens rims 20 may be moved simultaneously. Each supplemental semicircular lens rim 20 contains a supplemental magnifying segmental lens 22 which may be employed for close work such as reading or the like. When in use, the supplemental lenses assume a position as shown in FIGS. 2 and 4 in front of the lenses 14a to provide amplified magnification for close work.

Figure 2:
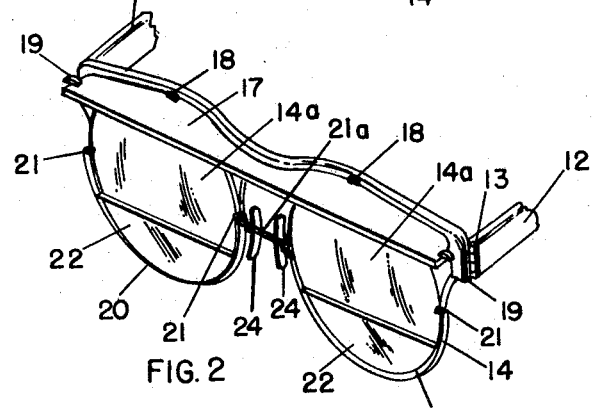
FIGURE 2 is a view similar to FIG. 1, parts thereof being broken away, showing the secondary lenses in position for use, the receptacle cover being open.
Figure 3:
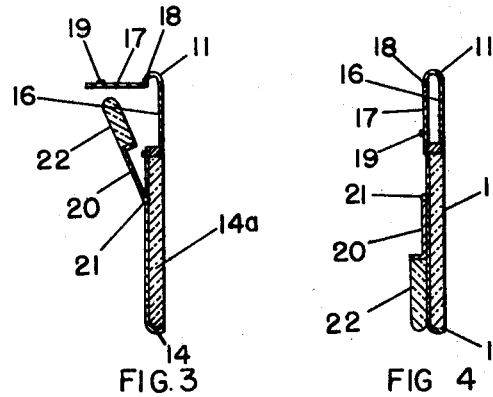
FIGURES 3, 4 and 5 are sectional views taken substantially along the center line of either lens and frame showing different positions of adjustment.
Figure 5:
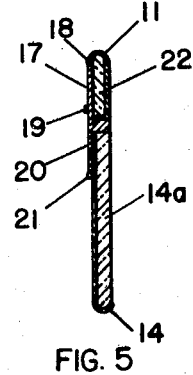

When the lenses are not in use, the cover 17 is moved to the position shown in FIGS. 2 and 3 and the supplemental lenses 22 are folded into recess or receptacle 16 to the position shown in FIGS. 1 and 5. The receptacle is then closed, and the supplemental lenses are completely out of the way in invisible position.

Means are provided for retaining lenses 22 against inadvertent movement when in position for use, and take the form of small magnets 23 embedded at suitable points in frames 14. When supplemental rims 20 are of metallic construction, the magnets serve to hold the latter securely in position. If the entire assembly or supplemental lens rims 20 are plastic or other non-magnetic materials, small metal plates may be positioned in confronting relation with magnets 23 if desired.

Conventional nose pads 24 may be provided if desired.

From the foregoing the use and operation of the device should now be readily understandable.

When distant viewing is desired, supplemental lenses 22 are folded into receptacle 16 and cover 17 is closed as shown in FIGS. 1 and 5. When it is desired to use the glasses for close reading, cover 17 is opened by means of finger grips 19, and lenses 22 and rims 20 are moved to the position shown in FIGS. 2 and 4, in which position magnetic catches 23 retain the components, and reading or other close work may be done by focusing the eyes through the composite lens assembly consisting of the lower portion of lens 14a and segmental lens 22. Ample space is left above segmental lenses 22 to permit normal distance viewing through the upper portion of lenses 14a.

From the foregoing it will now be seen that there is herein provided an improved spectacle assembly which accomplishes all the objects of this invention and others, including many advantages of great practical utility and commercial importance.

I claim:

1. A spectacle assembly comprising a frame including a top bar having a transverse receptacle therein, generally semicircular lens rims secured to and depending from said bar, lenses in said generally semicircular lens rims, supplemental semicircular lens rims hinged to intermediate portions of said generally semicircular lens rims, segmental lenses in said supplemental lens rims foldable outwardly into and from a position in said receptacle to a position overlying the bottom portion of said first mentioned lenses to provide multiple lens assemblies for close viewing, said receptacle being dimensioned whereby said segmental lenses and supplemental rims will interfit therewithin, and hinged cover means for said receptacle swingable outwardly therefrom.

2. The structure of claim 1 wherein finger engaging portions are provided on said cover facilitating pivotal movement thereof.

3. The structure of claim 1 wherein magnetic holding means are provided for holding said supplemental lens frames in operative position relative to said frame.

4. The structure of claim 1 wherein the supplemental lens rims are hinged to the generally semicircular lens rims at substantially the end of the transverse axis of said generally semicircular lens.

References Cited

UNITED STATES PATENTS

| | | | |
|---|---|---|---|
| 2,282,637 | 5/1942 | Bouchard | 351—58 |
| 2,326,787 | 8/1943 | Lorig | 351—57 |
| 2,393,959 | 2/1946 | Blumenthal | 351—57 |
| 2,737,847 | 3/1956 | Tesauro | 351—57 |

FOREIGN PATENTS 647  3/1858  Great Britain.

DAVID SCHONBERG, Primary Examiner

ROBERT L. SHERMAN, Assistant Examiner